(12) United States Patent
Thomas et al.

(10) Patent No.: US 11,858,286 B2
(45) Date of Patent: Jan. 2, 2024

(54) PRINTABLE RECORDING MEDIA

(71) Applicant: HEWLETT-PACKARD DEVELOPMENT COMPANY, L.P., Spring, TX (US)

(72) Inventors: Jake H. Thomas, San Diego, CA (US); Xiaoqi Zhou, San Diego, CA (US); Xulong Fu, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 298 days.

(21) Appl. No.: 17/599,363

(22) PCT Filed: Feb. 25, 2020

(86) PCT No.: PCT/US2020/019614
§ 371 (c)(1),
(2) Date: Sep. 28, 2021

(87) PCT Pub. No.: WO2021/173117
PCT Pub. Date: Sep. 2, 2021

(65) Prior Publication Data
US 2022/0169064 A1 Jun. 2, 2022

(51) Int. Cl.
*B41M 5/50* (2006.01)
*B41M 5/52* (2006.01)

(52) U.S. Cl.
CPC ............ *B41M 5/5254* (2013.01); *B41M 5/52* (2013.01); *B41M 5/5218* (2013.01); *B41M 5/5236* (2013.01); *B41M 5/5263* (2013.01); *B41M 5/5272* (2013.01); *B41M 5/5281* (2013.01)

(58) Field of Classification Search
CPC . B41M 5/5254; B41M 5/5218; B41M 5/5281
USPC ........................................................ 428/32.21
See application file for complete search history.

(56) References Cited

U.S. PATENT DOCUMENTS

| | | | | |
|---|---|---|---|---|
| 9,062,227 | B2 | 6/2015 | Koenig | |
| 2010/0304124 | A1 | 12/2010 | Haenen et al. | |
| 2013/0243977 | A1* | 9/2013 | Zhou | G03G 7/0046 399/237 |

(Continued)

FOREIGN PATENT DOCUMENTS

| | | | |
|---|---|---|---|
| CN | 104558689 | A | 4/2015 |
| JP | 2009209052 | A | 9/2009 |

(Continued)

*Primary Examiner* — Betelhem Shewareged
(74) *Attorney, Agent, or Firm* — HP Inc. Patent Department

(57) ABSTRACT

A printable recording media that comprises a base substrate with an image-side and a back-side and a coating composition comprising, at least, particles of metallic salt of $C_8$-$C_{30}$ alkyl acid chain or alkyl ester chain having a mean particle size ($D_{50}$) above 3 μm and having about 99.5% of the particle size distribution which is less than 80 μm, inorganic pigment particles and/or mixture inorganic particles, and polymeric binders and/or mixture of polymeric binders, is applied to the image-side of the base substrate. Also described herein are a method for forming the printable recording media and a printing method that includes ejecting an ink composition onto the print media described herein.

15 Claims, 2 Drawing Sheets

(56) References Cited

U.S. PATENT DOCUMENTS

| | | | | |
|---|---|---|---|---|
| 2013/0323504 | A1* | 12/2013 | Zhou | G03G 13/20 524/427 |
| 2015/0298986 | A1 | 10/2015 | Billieres et al. | |
| 2021/0121899 | A1* | 4/2021 | Kalinich | B05B 7/0408 |
| 2022/0169064 | A1* | 6/2022 | Thomas | B41M 5/52 |

FOREIGN PATENT DOCUMENTS

| | | | |
|---|---|---|---|
| JP | 2011161841 | A | 8/2011 |
| JP | 2011213010 | A | 10/2011 |
| JP | 5697568 | B2 | 4/2015 |
| WO | WO-2018182593 | A1 | 10/2018 |

* cited by examiner

PRINTABLE RECORDING MEDIA

CROSS-REFERENCE TO RELATED APPLICATIONS

This Utility Patent Application is a U.S. National Stage filing under 35 U.S.C. § 371 of PCT/US2020/019614, filed Feb. 25, 2020, incorporated by reference herein.

BACKGROUND

Inkjet printing is a non-impact printing method in which an electronic signal controls and directs droplets or a stream of ink that can be deposited on a variety of substrates. Current inkjet printing technology involves forcing the ink drops through small nozzles by thermal ejection, piezoelectric pressure or oscillation, onto the surface of a media. This technology has become a popular way of recording images on various media surfaces, particularly paper, for many reasons, including low printer noise, capability of high-speed recording and multi-color recording. Inkjet web printing is a technology that is specifically well adapted for commercial and industrial printing. It has rapidly become apparent that the image quality of printed images using such printing technology is strongly dependent on the construction of the recording media used. Consequently, improved recording media, often specifically designed, have been developed.

BRIEF DESCRIPTION OF THE DRAWINGS

The drawings illustrate various examples of the present printable recording media and are part of the specification.

DETAILED DESCRIPTION

Figure 1:
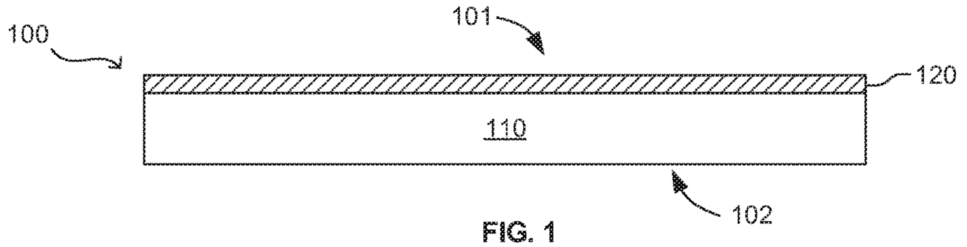
FIG. 1 and FIG. 2 are cross-sectional views of the printable recording media according to some examples of the present disclosure.

In many commercial inkjet printing applications, the ink formulation space is constrained by the capability of inkjet nozzles to reliably jet the fluid. One important limitation is the amount of binder that can be used in the ink. Ink formulations with low amounts of binder loading tend to have durability challenges which presents challenges to adopting inkjet technology in durability intensive applications such as magazines, direct mail, post cards, etc.

The default solution today for improving print durability of inkjet and offset alike, is by using an overprint varnish (OPV) to protect the ink layer against abrasive forces. OPV coatings are often applied inline, at the tail end of the printing process. As a result, they serve as a protective barrier for any post-print processes that have the potential to damage the image layer such as cutting, stacking, folding, gluing, transportation, etc. While overprint varnishes significantly enhance print durability, they come with added cost and logistics of managing the application of an additional fluid, necessitating purchase of coating hardware, energy costs to operate the OPV coater, factory floorspace to house the hardware, and upkeep of the equipment. In addition, OPV coating does nothing to protect the print before the OPV fluid is applied to the web. In this critical stage between deposition of ink on page and coating of OPV fluid, the inked web comes into contact with many surfaces which have the potential to damage the print.

To facilitate entry of thermal inkjet printing processes into commercial printing applications without modifying existing processes, the easiest way to gain improvements in print durability is through modification of the printing substrate itself. The problem solved with this invention disclosure involves a rub durability enhancing additive into the media coating composition to improve print durability for downstream processing. The solution presented from this disclosure involves a coating formulation and the printable recording media containing it which creates image receiving layer for high-speed inkjet web press printing with excellent durability and imaging quality.

In one example, the present disclosure is drawn to a printable recording media, or printable medium, comprising a base substrate with an image-side and a back-side and an coating layer, applied to at least the image-side of the base substrate, The coating composition comprises, at least, particles of metallic salt of $C_8$-$C_{30}$ alkyl acid chain or alkyl ester chain, having a mean particle size ($D_{50}$) above 3 μm and having about 99.5% of the particle size distribution which is less than 80 μm; inorganic pigment particles and/or mixture inorganic particles; and polymeric binders and/or mixture of polymeric binders.

In another example, the present disclosure is drawn to a printable recording media, or printable medium, with coating composition forming, image receiving surface, that are applied to both sides of the base substrate. The present disclosure also relates to a method for forming said printable recording media and to the printing method using said printable medium. The method for forming a printable recording media comprises providing a base substrate, with an image-side and a back-side; applying a coating composition comprising, at least, particles of metallic salt of $C_8$-$C_{30}$ alkyl acid chain or alkyl ester chain having a mean particle size ($D_{50}$) above 3 μm and having about 99.5% of the particle size distribution which is less than 80 μm; inorganic pigment particles and/or mixture inorganic particles; and polymeric binders and/or mixture of polymeric binders; to the image-side of the base substrate and drying the coating composition to remove water from the media substrate to leave a coating composition thereon.

The printable recording media, or printable medium, according to the present disclosure is particularly well suited for inkjet printing technology and application. In some examples, the printable media is well adapted to be used in web press applications with high speed print rates, e.g., using the HP T200 Web Press or HP T300 Web Press at rates of 1000 feet per minute or more. In some other examples, printable media is to be printed with inkjet printing technology such as "HP Page Wide Array printing" where more than hundreds of thousand tiny nozzles on a stationary print-head that spans the width of a page, delivering multi-colors ink onto a moving sheet of paper under a single pass to achieve the super-fast printing speed. Printing applications which benefit from high grade printing media (such as magazines, catalogs, books, manuals, direct mails, labels, or other similar print jobs) where large volumes of high-quality glossy image are printed very quickly, are particularly advantaged by the printable recording media described herein.

The media, according to the present disclosure, is a coated printable recording media. By "coated", it is meant herein that the printable recording media has been applied a composition. It is noted that the term "coating composition" refers to either a composition used to form a coating layer as well as the coating layer itself, the context dictating which is applicable. For example, a coating composition or coating that includes an evaporable solvent is referring to the compositional coating that is applied to a media substrate. Once coated on a media substrate and after the evaporable solvent is removed, the resulting coating layer can also be referred to as a coating. The coating composition can be applied to various media to improve, for example, printing characteristics and attributes of an image. In some examples, the coating composition is a composition that is going to be applied to an uncoated printable recording media. By "uncoated", it is meant herein that the printable recording media has not been treated or coated by any composition in one example, however, the top surface of the paper web might have been applied with some chemicals such as starch or other chemicals known as surface sizing agent on a paper machine.

The coated media, according to the present disclosure, is a printable recording medium (or printable media) that provide printed images that have outstanding print durability and excellent scratch resistance while maintaining good printing characteristics and image quality (i.e. printing performance). As good printing characteristics, it is meant herein good black optical density, good color gamut and sharpness of the printed image. The images printed on the printable recording media will thus be able to impart excellent image quality: vivid color, such as higher gamut and high color density. High print density and color gamut volume are realized with substantially no visual color-to-color bleed and with good coalescence characteristics.

The images printed on the printable recording media will also have excellent durability and excellent scratch resistance; specifically, it will have excellent durability under mechanical actions such as rubbing and scratching. By "scratch resistance", it is meant herein that the composition is resistant to any modes of scratching which include, scuff and abrasion. By the term "scuff", it is meant herein damages to a print due to dragging something blunt across it (like brushing fingertips along printed image). Scuffs do not usually remove colorant, but they do tend to change the gloss of the area that was scuffed. By the term "abrasion", it is meant herein the damage to a print due to wearing, grinding or rubbing away due to friction. Abrasion is correlated with removal of colorant (i.e. with the OD loss).

Figure 2:
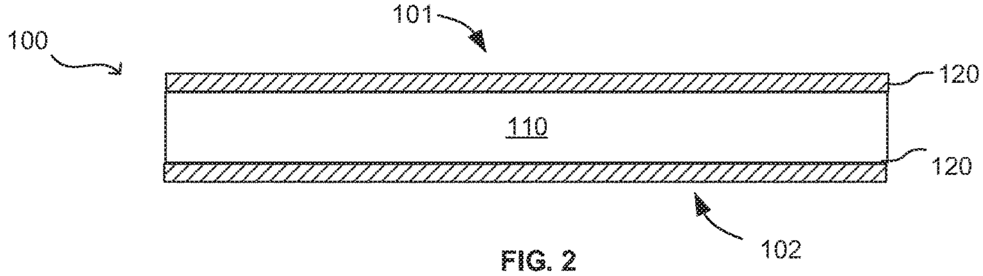
Figure 3:
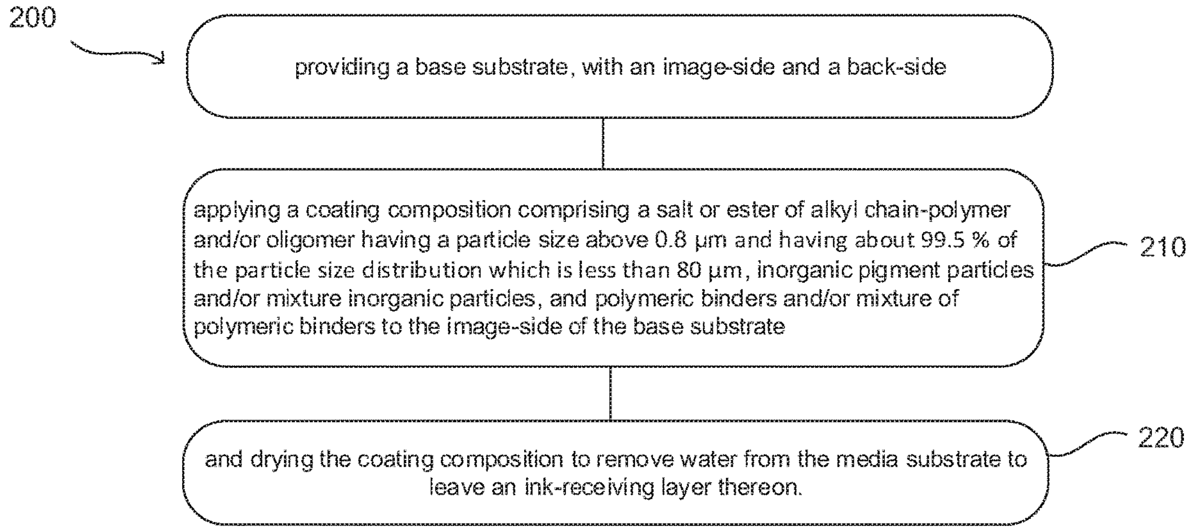
FIG. 3 is a flowchart illustrating a method for producing the printable recording media according to one example of the present disclosure.

FIG. 1 and FIG. 2 schematically illustrate some examples of the printable recording media (100) as described herein. FIG. 3 is a flowchart illustrating an example of a method for producing the printable recording media. As will be appreciated by those skilled in the art, FIG. 1 and FIG. 2 illustrate the relative positioning of the various layers of the printable media without necessarily illustrating the relative thicknesses of the various layers. It is to be understood that the thickness of the various layers is exaggerated for illustrative purposes.

FIG. 1 illustrates the printable recording media (100) as described herein. The printable recording media (100) encompasses a base substrate or media substrate or bottom supporting substrate (110) and a coating composition (120). The coating composition is applied on, at least, one side of the substrate (110) in order to from a coating layer (120) that could be called ink-receiving coating layer. The coating layer composition is thus applied on one side, i.e. the image side, only and no other coating is applied on opposite side. The image side with the coating layer is considered as the side where the image will be printed. The printable media (100) has two surfaces: a first surface which might be referred to as the "coating side", "image surface" or "image side" (101) when coated with the coating layer and a second surface, the opposite surface, which might be referred to as the "back surface" or "back-side" (102).

FIG. 2 illustrates another example of the printable recording media (100) as described herein. The printable media (100) encompasses a base substrate (110) with coating layers (120) that are applied to both the "image side" (101) and the "back-side" (102) of the print media. In theory, both the image side and the back-side could be printed and functionalized as ink-receiving coating layer.

An example of a method (200) for forming a printable recording media in accordance with the principles described herein, by way of illustration and not limitation, is shown in FIG. 3. As illustrated in FIG. 3, such method encompasses providing (210) a base substrate, with an image-side and a back-side, applying (210) a coating layer comprising, at least, particles of metallic salt of $C_8$-$C_{30}$ alkyl acid chain or alkyl ester chain having a mean particle size ($D_{50}$) above 3 μm and having about 99.5% of the particle size distribution which is less than 80 μm, inorganic pigment particles and/or mixture inorganic particles, and polymeric binders and/or mixture of polymeric binders to the image-side of the base substrate and drying (220) the coating composition to remove water from the media substrate to leave a coating layer thereon in order to obtain the printable recording media.

The present disclosure relates thus also to a coated printable recording media, with an image-side (101) and a back-side (102), comprising a base substrate (110) and a coating layer (120). The coating layer comprises, at least, particles of metallic salt of $C_8$-$C_{30}$ alkyl acid chain or alkyl ester chain, having a mean particle size (D50) above 3 μm and having about 99.5% of the particle size distribution which is less than 80 μm; inorganic pigment particles and/or mixture inorganic particles, and polymeric binder and/or mixture of polymeric binders. Such layer is called "coating layer" or "ink-receiving layer" and can also be called coating layer since, during the printing process, the ink will be directly deposited on its surface. In some other examples, the printable recording media comprises a base substrate (110) and coating layers (120) with particles of metallic salt of $C_8$-$C_{30}$ alkyl acid chain or alkyl ester chain, having a mean particle size (D50) above 3 μm and having about 99.5% of the particle size distribution which is less than 80 μm; inorganic pigment particles and/or mixture inorganic particles, and polymeric binder and/or mixture of polymeric binders, that are applied to both opposing sides of the base substrate.

In some examples, the coating composition can further comprise, as optional ingredients, fixative agents. In some other examples, the coating composition can further comprise, as optional ingredients, COF (coefficient of friction) controlling agents. In some other examples, the coating composition might further comprise, as optional ingredients, ink colorant fixing agents, surfactant and/or other processing aids such as pH control agent, deformer and biocide.

The coating composition (120) can be disposed on the image-side (101) of the base substrate (110), at a coat-weight in the range of about 0.5 to about 40 gram per square meter ($g/m^2$ or gsm), or in the range of about 3 gsm to about 20 gsm, or in the range of about 5 to about 15 gsm. In some other examples, coating layers (120) are disposed on the image-side (101) and on the back-side (102) of the base substrate (110), at a coat-weight in the range of about 0.5 to about 40 gram per square meter ($g/m^2$ or gsm), or in the range of about 3 gsm to about 20 gsm, or in the range of about 5 to about 15 gsm.

In some examples, the printable recording media, comprising a base substrate (110) and coating layers (120) can further encompasses a "base-coating layer" (not illustrated in the figure provided herein). Such base-coating layer would be positioned between the base substrate (110) and the coating layer (120). Such base-coating layer would then be in a sandwich position between the base substrate (110) and the coating layer (120) and could be applied to both opposing sides of the base substrate (120), i.e. image-side and a back-side. When present, such base-coating layer can comprise at least a polymeric binder and an inorganic filler. In some examples, the polymeric binder can be present in a dry weight amount representing from about 5% to about 25% of the base-coating layer. In some examples, the inorganic filler can be present in a dry weight amount representing from about 50% to about 95% of the base-coating layer. The polymeric binder could be identical or could be different from the polymeric binder that has been defined for the coating layer (120). The inorganic filler could be identical or could be different from the pigment particles that has been defined for the coating layer (120). The base-coating layer can also include other processing additives such PH control agents, surfactants, and rheological control agents. When present, the total coat dry weight of base-coating layer could range from about 5 gsm to about 30 gsm. In some examples, the base coating composition might also further comprise, as an optional ingredient, an ink colorant fixing agent or fixative agent as described for the coating composition mentioned herein.

The printable recording media of the present disclosure comprises, at least, a coating composition (120) that includes particles of metallic salt of $C_8$-$C_{30}$ alkyl acid chain or alkyl ester chain, having a mean particle size ($D_{50}$) above 3 μm ($1\times10^{-6}$ m, micrometer or micron) and having about 99.5% of the particle size distribution which is less than 80 μm.

Without being linked by any theory, it is believed that the particles of metallic salt having a $C_8$-$C_{30}$ alkyl acid chain or alkyl ester chain used the specific particle size (PS) and particle size distribution (PSD) as defined herein would act as a rub durability enhancer that has the ability to improve scuff-resistance of downstream processes. Such particles of metallic salt could thus be used as the scuff resistance additive. In some examples, the particles of metallic salt are organic particles that are dispersed in aqueous solution and that are present in an emulsion form. In some examples, the printable recording media of the present disclosure comprises, at least, a coating composition (120) that includes particles of metallic salt having a $C_{12}$-$C_{20}$ alkyl acid chain or alkyl ester chain with an average having a mean particle size ($D_{50}$) greater than 3 μm and having about 99.5% of the particle size distribution which is less than 80 μm. In some examples, the printable recording media of the present disclosure comprises a coating composition (120) that includes particles of metallic salt having a $C_{17}$ alkyl acid chain or alkyl ester chain with an average a mean particle size ($D_{50}$) greater than 3 μm and having about 99.5% of the particle size distribution which is less than 80 μm. In some examples, the particles of metallic salt of $C_8$-$C_{30}$ alkyl acid chain or alkyl ester chain can be pre-emulsified with surfactants into the dispersed aqueous emulsion of particles with an average a mean particle size ($D_{50}$) greater than 3 μm and having about 99.5% of the particle size distribution which is less than 80 μm.

The coating composition (120) can include particles of metallic salt that are calcium salt of stearic acid with an average a mean particle size ($D_{50}$) greater than 3 μm and having about 99.5% of the particle size distribution which is less than 80 μm. In some examples, the particles of metallic salt have an alkyl acid chain or alkyl ester chain comprising from 8 to 30 carbon atoms, i.e. is a has a $C_8$ to $C_{30}$ alkyl chain. In some other examples, the alkyl acid chain or alkyl ester chain comprise from 12 to 20 carbon atoms. In yet some examples, the chain is a $C_{17}$ alkyl chain. In yet some other examples, the particles of metallic salt are calcium stearate (i.e. Calcium octadecenoate). Said calcium stearate can be produced by the reaction of by stearic acid with calcium oxide under heating.

These $C_8$ to $C_{30}$ and $C_{12}$ to $C_{20}$ alkyl chain can be alkyl chain polymeric derivatives which may contain carboxy functional groups initially and transformed then into metallic salt or react into ester with another hydroxyl function chemical. The metallic ion on the polymeric salt can be, for example, but not limited to, sodium, calcium, magnesium or zinc ions. In some examples, the metallic ion on the polymeric salt is calcium. In some examples, the printable recording media of the present disclosure comprises a coating composition that includes a calcium stearate dispersion in water. Depending on the method of production, stearic acid may contain large amounts of other organic acids ranging from lauric acid to behenic acid or unsaturated acids such as oleic or linoleic. Accordingly, a stearate may contain significant amounts of laurate, palmitate, or oleate.

Figure 4:
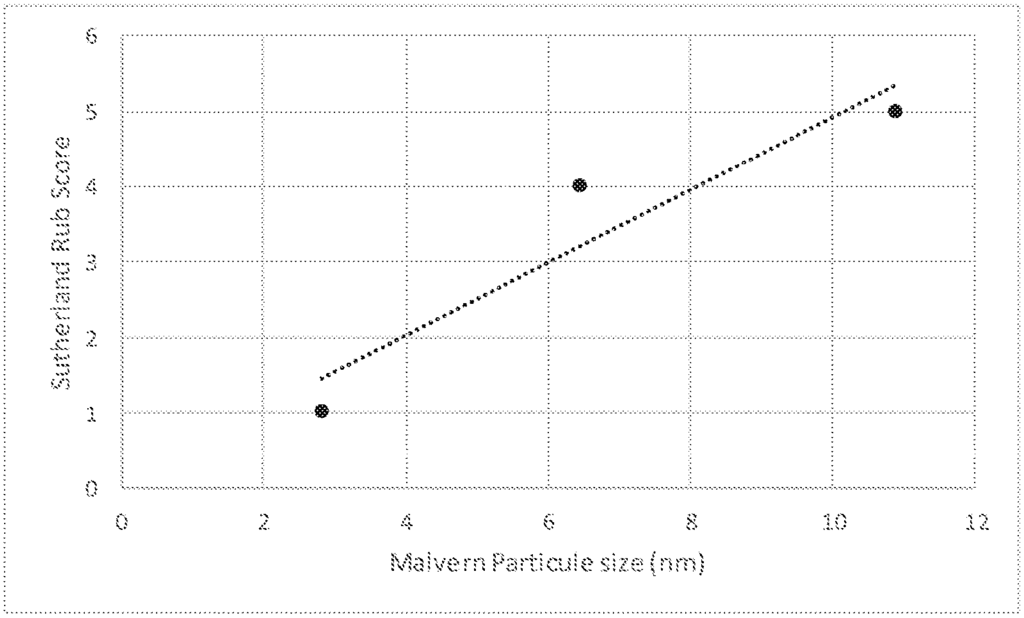
FIG. 4 is a graph demonstrating the influence of the Malvern particle size distribution of one ingredient of the printable recording media, according to one example of the present disclosure, on the Sutherland dry rub score.
Figure 5:
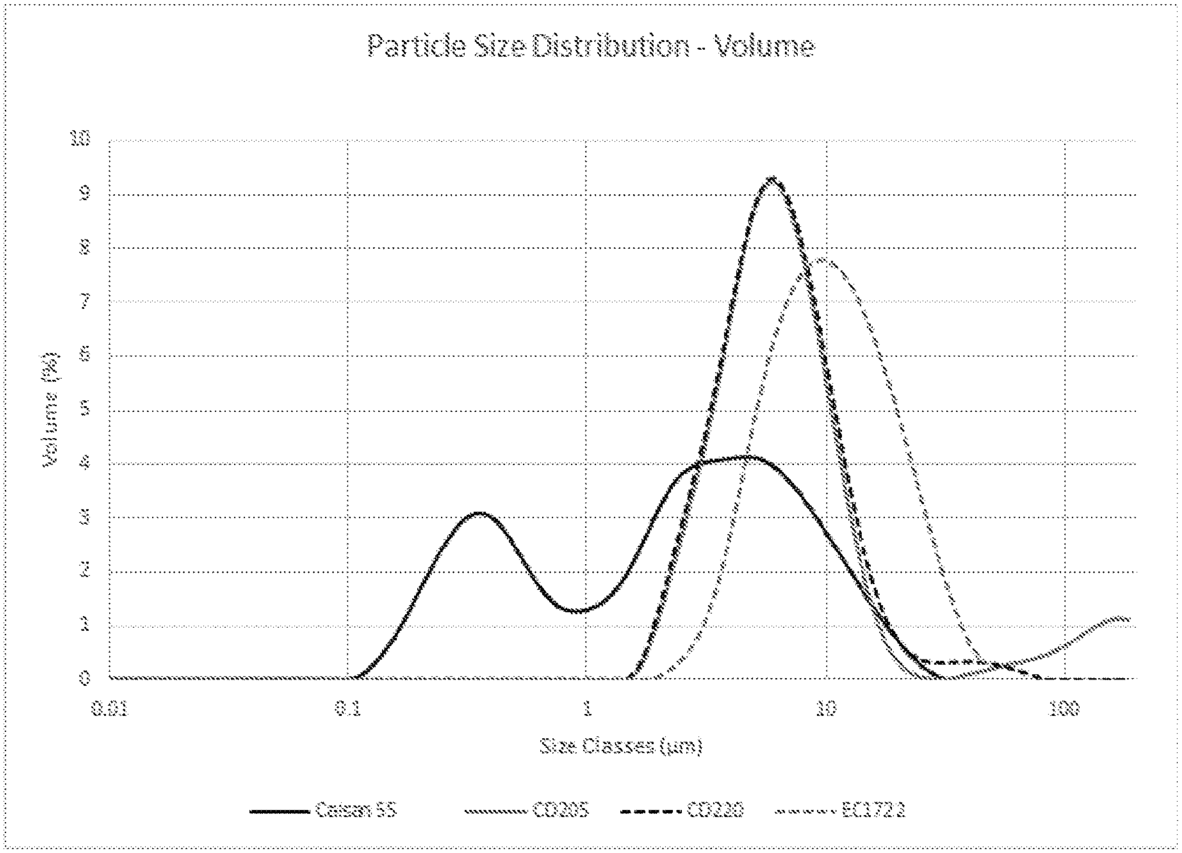
FIG. 5 is a graph illustrating the particle size distribution of one ingredient of the printable recording media, according to one example of the present disclosure.

Without being linked by any theory, it is found that scratch enhancement effectiveness of the organic acid salt and ester is not only associated with chemical structure such as chain length, metallic ion type, charge density, etc, but also greatly depends on the particle size (PS) and particle size distribution (PSD) of the organic particulate. A mean particle size (D50) ranged from 5 to 15 micrometer have proven to be more effective at improving scuff resistance of printed substrate as illustrated in FIG. 4. FIG. 4 is a graph demonstrating the influence of the Malvern particle size distribution of particles of metallic salt of $C_8$-$C_{30}$ alkyl acid chain or alkyl ester chain on the Sutherland dry rub score according to one example of the present disclosure. FIG. 5 is a graph illustrating the particle size distribution of particles of metallic salt of $C_8$-$C_{30}$ alkyl acid chain or alkyl ester chain, according to one example of the present disclosure.

The particle size distribution (PDS) plays also an important role in the scratch resistance properties of the particles of the present disclosure. Indeed, particles of metallic salt as defined herein with "narrow" and single bell curve distribution will perform better over the particles of metallic salt having non-single bell curves (i.e. bimodal shapes, J-shapes or skew shapes). FIG. 5 illustrates this distribution shape related effectiveness. All tested particles have metallic salt particles of $C_8$-$C_{30}$ alkyl acid chain or alkyl ester chain and but do not have the same particle size distribution.

The particles of metallic salt of $C_8$-$C_{30}$ alkyl acid chain or alkyl ester chain have a mean particle size (D50) above 3 μm and have about 99.5% of the particle size distribution which is less than 80 μm. In some examples, the particles of metallic salt of $C_8$-$C_{30}$ alkyl acid chain or alkyl ester chain have a mean particle size ($D_{50}$) that is ranging from about 5 μm to about 30 μm and have about 99.5% of the particle size distribution which is less than 80 μm. In some other examples, the particles of metallic salt of $C_8$-$C_{30}$ alkyl acid chain or alkyl ester chain have a mean particle size ($D_{50}$) that is ranging from about 8 μm to about 20 μm and have about 99.5% of the particle size distribution which is less than 80 μm.

In some examples, the particles of metallic salt of $C_8$-$C_{30}$ alkyl acid chain or alkyl ester chain, have a mean particle size ($D_{90}$) above 10 μm and have about 99.5% of the particle size distribution which is less than 80 μm. The particles of metallic salt of $C_8$-$C_{30}$ alkyl acid chain or alkyl ester chain can also have a mean particle size ($D_{90}$) that is ranging from about 15 μm to about 40 μm and have about 99.5% of the particle size distribution which is less than 80 μm.

In some examples, the printable recording media of the present disclosure comprises, at least, a coating composition (120) that includes a calcium stearate dispersion having a mean particle size ($D_{50}$) above 3 μm and having about 99.5% of the particle size distribution which is less than 80 μm. In some other examples, the printable recording media of the present disclosure comprises, at least, a coating composition (120) that includes a calcium stearate dispersion having a particle size that is from about 5 μm to about 20 μm and having about 99.5% of the particle size distribution which is less than 80 μm.

The particle size, as used herein, refers herein to the $D_{50}$ particle size. The "$D_{50}$" particle size is defined as the particle size at which about half of the particles are larger than the $D_{50}$ particle size and about half of the other particles are smaller than the $D_{50}$ particle size (by weight based on the metal particle content of the particulate build material). Likewise, the "$D_{90}$" is defined as the particle size at which about 5 wt % of the particles are larger than the $D_{90}$ particle size and about 90 wt % of the remaining particles are smaller than the $D_{90}$ particle size. Likewise, the "$D_{10}$" is defined as the particle size at which about 5 wt % of the particles are larger than the $D_{10}$ particle size and about 10 wt % of the remaining particles are smaller than the $D_{10}$ particle size As used herein, the particle size (PS) is based on volume of the particle size normalized to a spherical shape for diameter measurement, for example. The particle size is expressed in micrometer (μm) (i.e., $1\times10^{-6}$ m or micron). As used herein, the particle size distribution (PSD) of a material is a value, expressed in percentage % of total volume of the particle, that defines the relative quantity of particles present according to specific size. The PSD is defined in terms of discrete size ranges. Particle sizes and particles size distribution are measured using a Malvern Dynamic Light Scattering Instrument or are measured using dynamic light scattering (DLS) on a Malvern Mastersizer 3000 with Aero S attachment.

The particles of the present disclosure, i.e. the metallic salt of $C_8$-$C_{30}$ alkyl acid chain or alkyl ester chain, have a mean particle size ($D_{50}$) above 3 μm, and have about 99.5% of the particle size distribution, which is less than 80 μm, in one example. In another example, the particles of the present disclosure, i.e. the metallic salt of $C_8$-$C_{30}$ alkyl acid chain or alkyl ester chain, have a mean particle size ($D_{50}$) above 3 μm, and have about 99% of the particle size distribution which is less than 50 μm.

In some examples, the coating composition includes particles of metallic salt of $C_8$-$C_{30}$ alkyl acid chain or alkyl ester chain, have a mean particle size ($D_{50}$) above 3 μm and have about 99.5% of the particle size distribution which is less than 80 μm, in an amount ranging from about 1 wt % to about 10 wt % by total weight of the coating composition. In some other examples, the particles of metallic salt of $C_8$-$C_{30}$ alkyl acid chain or alkyl ester chain are present, the coating composition, in an amount ranging from about 1.5 to 5 wt % by total weight of the coating composition. In yet some other examples, the particles of metallic salt of $C_8$-$C_{30}$ alkyl acid chain or alkyl ester chain are present, the coating composition, in an amount ranging from about 1.5 to 3 wt % by total weight of the coating composition.

The printable recording media of the present disclosure comprises a coating composition (120) containing inorganic pigment particles and/or mixture inorganic particles. The coating composition (120) composition includes at least one type of pigment particles, or a mixture of different types of particulate fillers. The wording "type" refers to chemical composition, crystalline structure, particle size and size distribution, and chemical and physical condition of the particle surface such as surfactant treated and high temperature calcined. In one example, the particulate filler is clay or calcium carbonate particles, such as ground calcium carbonate (GCC) or precipitated calcium carbonate (PCC). In some examples, the clay particles and calcium carbonated particles of the various types described above, can be co-dispersed in the coating layer with other particulate fillers. The dispersion of the particles or mixture of the particles is compatible with the reactive crosslinking agent, meaning thus that there is no precipitation when mixing.

Other particulate fillers that can be used in addition to the calcium carbonate particles include inorganic fillers which can generate micro-porous structure to improved ink absorbing. Examples include fumed silica and silica gels, as well as certain structured pigments. Structured pigments include those particles which have been prepared specifically to create a micro-porous structure. Examples of these structured pigments include calcine clays or porous clays that are reaction products of clay with colloidal silica. Other inorganic particles such as particles of titanium dioxide ($TiO_2$), silicon dioxide ($SiO_2$), aluminum trihydroxide (ATH), calcium carbonate ($CaCO_3$), or zirconium oxide ($ZrO_2$) can be present, or these compounds can be present in forms that are inter-calcined into the structured clay. In one example, the inorganic pigment particles may be substantially non-porous mineral particles that have a special morphology that can produce a porous coating structure when solidified into a coating layer.

The coating composition (120) can include at least one type of particulate filler, or a mixture of different types particulate fillers. There is no specific limitation in selecting chemistry of particulate fillers, as long as these fillers have no chemical reactions in the solution of image receiving coating mixture before coating, where the pH of mixture is normally ranged between 4.5 to 6.5. The particulate fillers can be selected from, for example, kaolin, Kailin clays, barium sulfate, titanium dioxide, zinc oxide, zinc sulfide, satin white, aluminum silicate, diatomite, calcium silicate, magnesium silicate, synthetic amorphous silica, colloidal silica, colloidal alumina, pseudo-boehmite, aluminum hydroxide, alumina, lithopone, zeolite, and various combinations. In one example, particulate fillers are selected from the group consisting of silica, clay, kaolin, talc, titanium dioxide, and zeolites. In another example, the filler particles used are in a dry-powder form or in a form of an aqueous suspension referred as slurry with cationic charged dispersion agent since most anionic charged dispersing agent will be crashed by reactive cross-linking agent described above.

Further, in another embodiment, the inorganic pigments are porous inorganic pigments. Porous inorganic pigments refer to pigment that include a plurality of pore structures to provide a high degree of absorption capacity for liquid ink vehicle via capillary action or other similar means. Examples of porous inorganic pigments include, but are not limited to, synthesized amorphous silica, colloidal silica, alumina, colloidal alumina, and pseudo-boehmite (aluminum oxide/hydroxide). In another embodiment, the porous inorganic pigments are mixed with low surface area inorganic pigments and/or organic pigments at a weight percent ratio raging from about 5% to about 40% of porous inorganic pigments. This mixture has the benefit of improving the ink absorption while not sacrificing other physical performance attributes such as gloss.

Precipitated calcium carbonate can be commercially available, for example, under the tradenames Albacar® (available from Minerals Technologies Inc.). Ground calcium carbonate is commercially available, for example, under the trade names Omyafil®, Hydrocarb®70 and Omyapaque® (all of which are available from Omya North America). Examples of commercially available filler clays are Kaocal®, EG-44, and B-80 (available from Thiele Kaolin Company). An example of commercially available talc is Finntalc®F03 (available from Mondo Minerals). In some examples, inorganic pigment particles and/or mixture inorganic particles can be present, in the coating composition in an amount representing from about 50 wt % to about 92 wt %, or in an amount representing from about from about 70 wt % to about 90 wt %, or in an amount representing from about from about 80 wt % to about 88 wt % based on the total dry weight of the coating layer(s).

The printable recording media of the present disclosure comprises a coating composition (120) containing polymeric binders and/or mixture of polymeric binders. In one example, the polymeric binder and/or mixture of polymeric binders can be present in the coating composition, in an amount representing from about 1 wt % to about 18 wt % with respect to the total dry weight of the coating layer. In another example, the polymeric binder and/or mixture of polymeric binders can be present in the coating composition in an amount from about 3 wt % to about 13 wt % with respect to the total dry weight of the coating layer. As a further example, the polymeric binder and/or mixture of polymeric binders can be present in the coating composition in an amount of from about 5 wt % to about 12 wt % with respect to the total dry weight of the coating layer.

The polymeric binder can be selected from synthetic and natural polymeric compounds as long as they are compatible with the reactive crosslinking agent, meaning thus that no precipitation occurs when mixing. In some examples, the polymeric binder is a water-dispersible polymeric binder or a water-soluble polymeric binder or a combination thereof. In some other examples, the polymeric binder can include both water-dispersible polymeric binder and water-soluble polymeric binder.

The ratio of water-soluble polymeric binders to water-dispersible polymeric binders can be of any value as long as such mixture provides a good adhesion to the substrate, to coating layers and to inorganic particles. In some examples, the polymeric binders can be a mixture of a water-dispersible polymeric binders and water-soluble polymeric binders that are present, in the coating layer, at a dry weight ratio of 1:25 to 1:1, 1:20 to 3:10, or 1:20 to 4:7, for example.

Water-dispersible binders can include conjugated diene copolymer latexes, such as styrene-butadiene copolymer or acrylonitrile-butadiene copolymer; acrylic copolymer latexes, such as polymer of acrylic acid ester or methacrylic acid ester or methyl methacrylate-butadiene copolymer; vinyl copolymer latexes, such as ethylene-vinyl acetate copolymer and vinyl chloride-vinyl acetate copolymer; urethane resin latexes; alkyd resin latexes; unsaturated polyester resin latexes; and thermosetting synthetic resins, such as melamine resins and urea resins, and combinations thereof. In some examples, the water-dispersible polymer can include polymeric latex or polymeric emulsion where the polymeric core surrounded by surfactant with mid to large molecular weight polymer. The polymeric core can be dispersed by a continuous liquid phase to form an emulsion-like composition. Examples of water-dispersible polymers include, but are not limited to, acrylic polymers or copolymers latex, vinyl acetate latex, polyesters latex, vinylidene chloride latex, styrene-butadiene latex, acrylonitrile-butadiene copolymers latex, styrene acrylic copolymer latexes, and/or the like Generally, the water-dispersible polymer can include particles having a weight average molecular weight (Mw) of 5,000 to 500,000. In one example, the water-dispersible polymer can range from 50,000 Mw to 300,000 Mw. In some examples, the average particle diameter can be from 10 nm to 5 μm and, as other examples. The particle size distribution of the water-dispersible polymer is not particularly limited, and either polymer having a broad particle size distribution or latex having a mono-dispersed particle size distribution may be used. It is also possible to use two or more kinds of polymer fine particles each having a mono-dispersed particle size distribution in combination.

The water-soluble polymer can be a macromolecule having hydrophilic functional groups, such as —OH, —COOH, —COC. Examples of the water-soluble polymers include, but are not limited to, polyvinyl alcohol, starch derivatives, gelatin, cellulose and cellulose derivatives, polyethylene oxide, polyvinyl pyrrolidone, or acrylamide polymers. By "water-soluble," it is noted that the polymer can be at least partially water-soluble, mostly water-soluble (at least 50%), or in some examples, completely water-soluble (at least 99%).

Water-soluble binders can include starch derivatives such as oxidized starch, etherified starch, and phosphate starch; cellulose derivatives such as methylcellulose, carboxymethylcellulose, and hydroxyethyl cellulose; polyvinyl alcohol derivatives such as polyvinyl alcohol or silanol modified polyvinyl alcohol; natural polymeric resins such as casein, and gelatin or their modified products, soybean protein, pullulan, gum arabic, karaya gum, and albumin or their derivatives; vinyl polymers such as sodium polyacrylate, polyacrylamide, and polyvinylpyrrolidone; sodium alginate; polypropylene glycol; polyethylene glycol; maleic anhydride; or copolymers thereof. In some examples, the binder of the base coating layer can include polyvinyl alcohol and a latex having a glass transition temperature from −50° C. to 35° C. In one example, the binder of the base coating layer can include a styrene-butadiene copolymer, such Litex® PX 9740 (Synthomer) and a polyvinyl alcohol, such as Mowiol® 4-98 (Kuraray America Inc.).

In some examples, the polymeric binder comprises a water-soluble binder that is a polyvinyl alcohol, a starch derivative, gelatin, a cellulose derivative, a copolymer of vinylpyrrolidone or an acrylamide polymer. In some examples, the polymeric binder comprises a water-dispersible binder that is polyurethane polymer, acrylic polymer or copolymer, vinyl acetate latex, polyester, vinylidene chloride latex, styrene-butadiene or acrylonitrile-butadiene copolymer.

In some examples, the coating composition might also further comprise, as an optional ingredient, an ink colorant fixing agent or fixative agent. It is believed that the fixing agent can chemically, physically, and/or electrostatically bind a marking material, such as an inkjet ink, at or near an outer surface of the coated print media to provide acceptable water-fastness, smear-fastness, and overall image stability. A function of the fixative agent can be thus to reduce ink dry time.

The fixative agents can be a metallic salt, a cationic amine polymer, a quaternary ammonium salt, or a quaternary phosphonium salt. The metallic salt may be a water-soluble mono- or a multi-valent metallic salt. The water-soluble metallic salt can be an organic salt or an inorganic salt. The fixative agent can be an inorganic salt. In some examples, the fixative agent is a water-soluble and multi-valent charged salts. Multi-valent charged salts include cations, such as Group I metals, Group II metals, Group III metals, or transition metals, such as sodium, calcium, copper, nickel, magnesium, zinc, barium, iron, aluminum and chromium ions. The associated complex ion can be chloride, iodide, bromide, nitrate, sulfate, sulfite, phosphate, chlorate, acetate ions. The fixative agent can be an organic salt; in some examples, the fixative agent is a water-soluble organic salt; in yet some other examples, the fixative agent is a water-soluble organic acid salt. Organic salt refers to associated complex ion that is an organic specifies, where cations may or may not the same as inorganic salt like metallic cations. Organic metallic salt are ionic compounds composed of cations and anions with a formula such as $(C_nH_{2n}+1COO^- M^+)$*(H2O)m where $M^+$ is cation species including Group I metals, Group II metals, Group III metals and transition metals such as, for example, sodium, potassium, calcium, copper, nickel, zinc, magnesium, barium, iron, aluminum and chromium ions. Anion species can include any negatively charged carbon species with a value of n from 1 to 35. The hydrates ($H_2O$) are water molecules attached to salt molecules with a value of m from 0 to 20. Examples of water-soluble organic acid salts include metallic acetate, metallic propionate, metallic formate, metallic oxalate, and the like. The organic salt may include a water-dispersible organic acid salt. Examples of water-dispersible organic acid salts include a metallic citrate, metallic oleate, metallic oxalate, and the like.

In some examples, the fixative agent is a water-soluble, divalent or multi-valent metal salt. Specific examples of the divalent or multi-valent metal salt used in the coating include, but are not limited to, calcium chloride, calcium acetate, calcium nitrate, calcium pantothenate, magnesium chloride, magnesium acetate, magnesium nitrate, magnesium sulfate, barium chloride, barium nitrate, zinc chloride, zinc nitrate, aluminum chloride, aluminum hydroxy-chloride, and aluminum nitrate. Divalent or multi-valent metal salt might also include $CaCl_2$, $MgCl_2$, $MgSO_4$, $Ca(NO_3)_2$, and $Mg(NO_3)_2$, including hydrated versions of these salts. In some examples, the water-soluble divalent or multi-valent salt can be selected from the group consisting of calcium acetate, calcium acetate hydrate, calcium acetate monohydrate, magnesium acetate, magnesium acetate tetrahydrate, calcium propionate, calcium propionate hydrate, calcium gluconate monohydrate, calcium formate and combinations thereof. In some examples, the fixative agent is calcium chloride and/or calcium acetate. In some other examples, the fixative agent is calcium chloride ($CaCl_2$).

When present, the fixative agent can be present in the coating composition in an amount representing from about 0.5 wt % to about 20 wt % or in an amount representing from about 1 wt % about 20 wt % of the total dry weight of the coating layer, for example. In some examples, the coating composition (120) can include a fixative agent and a binder system wherein the ratio of fixative agent to binder system is from about 1:5 to about. 1:30. In some other examples, the coating layer includes a fixative agent and a binder system wherein the ratio of fixative agent to binder system is from about 1:6 to about 1:15.

In some examples, the coating composition night also further comprise a COF (coefficient of friction) controlling agent as an optional ingredient. The addition of the COF controlling agent in the coating layer may advantageously assist in maintaining the appropriate COF (coefficient of friction) of the surface of coating layer in the desired range. The Coefficient of Friction (COF) can be evaluated using the TMI slips and friction tester (model #32-90) per the TAPPI T-549 om-01 method. Such COF controlling agent can also be called “slip aid agent”.

In some examples, COF controlling agent can be thermoplastic materials in the form of a dispersion or in the form of an emulsion. The thermoplastic material may be a single thermoplastic material or a combination of two or more thermoplastic materials. Whether used alone or in combination, each thermoplastic materials may have a melting temperature ranging from about 40° C. to about 250° C. The COF controlling agent, i.e. thermoplastic material, may be natural materials or polyolefin-based materials. In some examples, the thermoplastic material is a non-ionic material, an anionic material, or a cationic material. In some examples, the thermoplastic material is selected from the group consisting of a beeswax, a carnauba wax, a candelilla wax, a montan wax, a Fischer-Tropsch wax, a polyethylene-based wax, a high density polyethylene-based wax, a polybutene-based wax, a paraffin-based wax, a polytetrafluoroethylene-based material, a polyamide-based material, a polypropylene-based wax, and combinations thereof. In some other examples, the thermoplastic material is an anionic polyethylene wax emulsion, a poly-propylene based thermoplastic material, a high-density polyethylene non-ionic wax micro-dispersion or a high melt polyethylene wax dispersion. In yet some other examples, the thermoplastic material is a high-density polyethylene non-ionic wax micro-dispersion. Examples of suitable thermoplastic materials include Michem® and ResistoCoat™ products that are available from Michelman, Inc., Cincinnati, Ohio, and Ultralube® products that are available from Keim Additec Surface GmbH, Kirchberg/Hunsrück.

Some specific examples of the polyethylene-based wax include polyethylene (e.g., Michem® Wax 410), an anionic polyethylene wax emulsion (e.g., Michem® Emulsion 52830, Michem® Lube 103DI, and Michem® Lube 190), an anionic polyethylene wax dispersion (e.g., Michem® Guard 7140), a non-ionic polyethylene wax dispersion (e.g., Michem® Guard 25, Michem® Guard 55, Michem® Guard 349, and Michem® Guard 1350) a non-ionic polyethylene wax emulsion (e.g., Michem® Emulsion 72040), or a high melt polyethylene wax dispersion (e.g., Slip-Ayd® SL 300, Elementis Specialties, Inc., Hightstown, NJ). In some other examples, the thermoplastic material(s) may be an anionic paraffin/ethylene acrylic acid wax emulsion (e.g., Michem® Emulsion 34935), a cationic water based emulsion of polyolefin waxes (e.g., Michem® Emulsion 42035A), anionic microcrystalline wax emulsions (e.g., Michem® Lube 124 and Michem® Lube 124H), or a high density polyethylene/copolymer non-ionic wax emulsion (e.g., Ultralube® E-530V).

The coating composition may also include other optional coating additives such as surfactants, rheology modifiers, defoamers, optical brighteners, biocides, pH controlling agents, dyes, and other additives for further enhancing the properties of the coating. The total amount of optional coating additives may be in the range of 0 to 10 wt % based on the total amount of ingredients. Among these additives, rheology modifier or rheology control agent is useful for addressing runnability issues. Suitable rheology control agents include polycarboxylate-based compounds, polycarboxylated-based alkaline swellable emulsions, or their derivatives. The rheology control agent is helpful for building up the viscosity at certain pH, either at low shear or under high shear, or both. In certain embodiments, a rheology control agent is added to maintain a relatively low viscosity under low shear, and to help build up the viscosity under high shear. It is desirable to provide a coating formulation that is not so viscous during the mixing, pumping and storage stages, but possesses an appropriate viscosity under high shear.

The printable recording media (100) of the present disclosure, that can also be called herein printable recording media, is a media that comprises a base substrate (110). The base substrate (110) can also be called bottom supporting substrate or substrate. The word "supporting" also refers to a physical objective of the substrate that is to carry the coatings layer and the image that is going to be printed. In some examples, the base substrate (110) is a cellulose base substrate meaning thus that the substrate is a cellulose paper. Such cellulose base substrate can be a cellulose paper web.

The cellulose base substrate, or cellulose paper web, can be made of any suitable wood or non-wood pulp. Non-limitative examples of suitable pulp compositions include, but are not limited to, mechanical wood pulp, chemically ground pulp, chemi-mechanical pulp, thermo-mechanical pulp (TMP) and combinations of one or more of the above. In some examples, the cellulose paper web comprises a bleached hardwood chemical kraft pulp. The bleached hardwood chemical kraft pulp has a shorter fiber structure (about 0.3 to about 0.6 mm length) than soft wood pulp. The shorter fiber structure contributes to good formation of the paper product in roll or sheet form, for example.

Moreover, a filler may be incorporated into the pulp, for example, to substantially control physical properties of the paper product in roll or sheet form. Particles of the filler fill in the void spaces of the fiber network and substantially result in a denser, smoother, brighter and opaque sheet than without a filler. The filler may substantially reduce cost also, since filler is generally cheaper than the pulp itself. Examples of fillers that are incorporated into the pulp include, but are not limited to, ground calcium carbonate, precipitated calcium carbonate, titanium dioxide, kaolin clay, silicates, plastic pigment, alumina trihydrate and combinations of any of the above. An amount of the filler in the pulp may include as much as 15 percent (%) by weight, for example. In some examples, the amount of filler in the pulp ranges from about 0% to about 20% of the paper product in roll or sheet form. In another example, the amount of filler ranges from about 5% to about 15% of the paper product in roll or sheet form. In some examples, if the percentage of filler is more than 20% by weight, pulp fiber-to-fiber bonding may be reduced, which subsequently may decrease stiffness and strength of the resulting paper product in roll or sheet form.

Moreover, an internal sizing may be included, for example. Internal sizing may improve internal bond strength of the pulp fibers, and also may control resistance of the paper product in roll or sheet form to wetting, penetration, and absorption of aqueous liquids. Internal sizing processing may be accomplished by adding a sizing agent to a fiber furnish (or source of the pulp fiber) in the wet-end of paper manufacture. Non-limitative examples of suitable internal sizing agents include a rosin-based sizing agent, a wax-based sizing agent, a cellulose-reactive sizing agent and another synthetic sizing agent, and combinations or mixtures thereof. The degree of internal sizing may be characterized by Hercules Sizing Test (HST) value. In some examples, the cellulose-based paper web has an internal sizing with a low HST value ranging from 1 to 150. In some examples, the HST value ranges from about 10 to about 50. Excessive internal sizing may affect the print quality on the paper product, for example, it may cause color-to-color bleed of inks printed on the paper product.

The surface sizing composition according to the principles described herein comprises a macromolecular material, either natural or synthetic, in an amount from about 25% to about 75% dry weight; optionally, an inorganic metallic salt in an amount from about 3% to about 20% dry weight; and an amount of an inorganic pigment ranging from greater than 15% to about 60% dry weight in an aqueous mixture, such that a total dry weight equals about 100%. The aqueous mixture is a size press (SP)-applied surface sizing composition in online paper manufacture. In particular, the SP surface sizing composition according to the principles described herein has one or more of a lower content of macromolecular material, a lower content of salt and a higher content of inorganic pigment (filler) than a surface sizing of commercially available office printing paper in the marketplace. In some examples, the SP surface sizing composition according to the principles described herein has each of a lower content of macromolecular material, a lower content of salt and a higher content of inorganic pigment (filler) than the commercially available office printing paper.

The macromolecular material is a high molecular weight material, such as a high molecular weight polymeric material, that functions as both a sizing agent and a binder for the SP surface sizing composition. In some examples, the macromolecular material includes one or both of synthetic polymers and natural polymers. In particular, by definition, the macromolecular material one or more of is water-soluble or water-dispersible, has strong film forming capability, and can bind particles of the inorganic pigment to form a coating layer. Moreover, by definition, the macromolecular material is inert to the inorganic metallic salt. The term 'film-forming' as used herein means that, during drying, or i.e., when aqueous solvent is removed from the cellulose-based paper web, the macromolecules can form continuous network, or latex particles can aggregated together to form a continuous film, or a continuous barrier layer to the aqueous solvent or moisture at a macroscopic level. The term 'inert' as used herein means that the macromolecular material will not interact with a fixative so as to cause the polymers to be precipitated, gelled, or form any kind of solid particle, which would adversely reduce a binding capability of the macromolecular material and a coating ability of the SP surface sizing composition.

Examples of a synthetic polymer useful in the macromolecular material include, but are not limited to, polyvinyl alcohol, polyvinyl pyrrolidone, acrylic latex, styrene-butadiene latex, polyvinyl acetate latex, and a copolymer latex of any of the above-named monomers, and combinations or mixtures thereof. Examples of a natural polymer useful in the macromolecular material include, but are not limited to, casein, soy protein, a polysaccharide, a cellulose ether, an alginate, a virgin starch and a modified starch, and a combination of any of the above-named polymers. The starch species includes, but is not limited to, corn starch, potato starch, derivatized starch and modified starch including, but not limited to, ethylated starch, oxidized starch, anionic starch, and cationic starch. For example, an ethylated starch, such as K96F from Grain Processing Corp., Muscatine, IA, or a hydroxyethyl ether derivatized corn starch, such as Penford® 280 Gum (i.e., 2-hydroxyethyl starch ether, hydroxyethyl starch or ethylated starch) from Penford Products Co., Cedar Rapids, IA, may be used.

The printable recording media, described herein, is prepared by using several surface treatment compositions herein named a coating layer or coating composition. A method of making a coated print media includes applying a coating composition as a layer to a media substrate and drying the coating composition to remove water from the media substrate to leave a coating composition thereon.

In some examples, as illustrated in FIG. 3, a method (200) of making a printable recording media encompasses: providing (210) a base substrate (110) with an image-side and a back-side; applying (210) a coating composition(120) comprising particles of metallic salt of $C_8$-$C_{30}$ alkyl acid chain or alkyl ester chain having a mean particle size ($D_{50}$) above 3 μm and having about 99.5% of the particle size distribution which is less than 80 μm, inorganic pigment particles and/or mixture inorganic particles, and polymeric binders and/or mixture of polymeric binders to the image-side of the base substrate; and drying (220) the coating composition to remove water from the media substrate to leave a coating composition hereon in order to obtain the printable media. In some examples, the coating composition (120) is applied to the base substrate (110) on the image receiving side of the printable media. In some other examples, the coating composition(120) is applied to the supporting base substrate (110) on the image receiving side (101) and on the backside (102) of the printable media.

The coating layer (120) can be applied to the base substrate (110) by using any method appropriate for the coating application properties, e.g., thickness, viscosity, etc. Non-limiting examples of methods include size press, slot die, blade coating, Meyer rod coating and roll coater. In some examples, the coating layer can be applied in one single production run. When the coating layer is present on both sides of the base substrates, depending on set-up of production machine in a mill, both sides of the substrate may be coated during a single manufacture pass, or each side is coated in a separate pass. Subsequently, when the coating composition is dried, it can form a coating layer. Drying can be by air drying, heated airflow drying, heated dryer can, infrared heated drying, etc. Other processing methods and equipment can also be used. For one example, the coated media substrate can be passed between a pair of rollers, as part of a calendering process, after drying. The calendering device can be any kind of calendaring apparatus, including but not limited to off-line super-calender, on-line calender, soft-nip calender, hard-nip calender, or the like. Once applied to the image-side (101) of the base substrate (110), the coating composition(120) can be calendered. The calendaring can be done either in room temperature or at an elevated temperature and/or pressure. In one example, the elevated temperature can range from 40° C. to 60° C. In one example, the calender pressure can range from about 100 psi to about 2,000 psi. The coating layer (120) can be dried using any drying method in the arts such as box hot air dryer. The dryer can be a single unit or could be in a serial of 3 to 7 units so that a temperature profile can be created with initial higher temperature (to remove excessive water) and mild temperature in end units (to ensure completely drying with a final moisture level of less than 6% for example). The peak dryer temperature can be programmed into a profile with higher temperature at begging of the drying when wet moisture is high and reduced to lower temperature when web becoming dry. The web temperature during drying can be controlled in the range of about 80 to about 120° C. In some examples, the operation speed of the coating/drying line is 300 to 500 meters per minute.

Once the coating compositions are applied to the base substrate and appropriately dried, ink compositions can be applied by any processes onto the printable recording media. In some examples, the ink composition is applied to the printable recording media via inkjet printing techniques. A printing method could encompasses obtaining a coated printable media as defined herein and applying an ink composition onto said printable recording media to form a printed image. Said printed image will have, for instance, enhanced image quality and image permanence. In some examples, when needed, the printed image can be dried using any drying device attached to a printer such as, for instance, an IR heater.

The method for producing printed images, or printing method, includes providing a printable recording media such as defined herein; applying an ink composition on the coating layer of the print media, to form a printed image; and drying the printed image in a hot air or IR heated dryer in order to complete crosslink reaction and then provide, for example, a printed image with enhanced quality and enhanced image permanence. In some examples, the printing method for producing images is an inkjet printing method. By inkjet printing method, it is meant herein a method wherein a stream of droplets of ink is jetted onto the recording substrate or media to form the desired printed image. The ink composition may be established on the recording media via any suitable inkjet printing technique. Examples of inkjet method include methods such as a charge control method that uses electrostatic attraction to eject ink, a drop-on-demand method which uses vibration pressure of a Piezo element, an acoustic inkjet method in which an electric signal is transformed into an acoustic beam and a thermal inkjet method that uses pressure caused by bubbles formed by heating ink. Non-limitative examples of such inkjet printing techniques include thus thermal, acoustic and piezoelectric inkjet printing. In some examples, the ink composition is applied onto the recording media using inkjet nozzles. In some other examples, the ink composition is applied onto the recording method using thermal inkjet printheads.

In some examples, the printing method is a capable of printing more than about 50 feet per minute (fpm) (i.e. has a print speed that is more than about 50 fpm). The printing method described herein can be thus considered as a high-speed printing method. The web-speed could be from about 100 to about 4 000 feet per minute (fpm). In some other examples, the printing method is a printing method capable of printing from about 100 to about 1 000 feet per minute. In yet some other examples, the printing method is capable of printing at a web-speed of more than about 200 feet per minute (fpm). In some example, the printing method is a high-speed web press printing method. As "web press", it is meant herein that the printing technology encompasses an array of inkjet nozzles that span the width of the paper web. The array is thus able, for example, to print on 20", 30", and 42" wide web or on rolled papers.

In some examples, the printing method as described herein prints on one-pass only. The paper passes under each nozzle and printhead only one time as opposed to scanning type printers where the printheads move over the same area of paper multiple times and only a fraction of total ink is used during each pass. The one-pass printing puts 100% of the ink from each nozzle/printhead down at once and is therefore more demanding on the ability of the paper to handle the ink in a very short amount of time.

As mentioned above, a print media in accordance with the principles described herein may be employed to print images on one or more surfaces of the print media. In some examples, the method of printing an image includes depositing ink that contains particulate colorants. A temperature of the print media during the printing process is dependent on one or more of the nature of the printer, for example. Any suitable printer may be employed such as, but not limited to, offset printers and inkjet printers. In some examples, the printer is a HP T350 Color Inkjet Webpress printer (Hewlett Packard Inc.). The printed image may be dried after printing. The drying stage may be conducted, by way of illustration and not limitation, by hot air, electrical heater or light irradiation (e.g., IR lamps), or a combination of such drying methods. In order to achieve best performances, it is advisable to dry the ink at a maximum temperature allowable by the print media that enables good image quality without deformation. Examples of a temperature during drying are, for examples, from about 100° C. to about 205° C., or from about 120° C. to about 180° C. The printing method may further include a drying process in which the solvent (such as water), that can be present in the ink composition, is removed by drying. As a further step, the printable recording media can be submitted to a hot air-drying systems. The printing method can also encompass the use of a fixing agent that will retain with the pigment, present in the ink composition that has been jetted onto the media.

In some examples, the ink composition is an inkjet ink composition that contains one or more colorants that impart the desired color to the printed message and a liquid vehicle. As used herein, "colorant" includes dyes, pigments, and/or other particulates that may be suspended or dissolved in an ink vehicle. The colorant can be present in the ink composition in an amount required to produce the desired contrast and readability. In some examples, the ink compositions include pigments as colorants. Pigments that can be used include self-dispersed pigments and non-self-dispersed pigments. Any pigment can be used; suitable pigments include black pigments, white pigments, cyan pigments, magenta pigments, yellow pigments, or the like. Pigments can be organic or inorganic particles as well known in the art. As used herein, "liquid vehicle" is defined to include any liquid composition that is used to carry colorants, including pigments, to a substrate. A wide variety of liquid vehicle components may be used and include, as examples, water or any kind of solvents.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise. In describing and claiming the examples disclosed herein, the singular forms "a", "an", and "the" include plural referents unless the context clearly dictates otherwise.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, "liquid vehicle" or "ink vehicle" refers to a liquid fluid in which colorant, such as pigments, can be dispersed and otherwise placed to form an ink composition. A wide variety of liquid vehicles may be used with the systems and methods of the present disclosure. Such liquid vehicles may include a mixture of a variety of different agents, including, water, organic co-solvents, surfactants, anti-kogation agents, buffers, biocides, sequestering agents, viscosity modifiers, surface-active agents, water, etc.

As used herein, "pigment" generally includes pigment colorants. As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight ratio range of about 1 wt % to about 20 wt % should be interpreted to include not only the explicitly recited limits of about 1 wt % and about 20 wt %, but also to include individual weights such as 2 wt %, 11 wt %, 14 wt %, and sub-ranges such as 10 wt % to 20 wt %, 5 wt % to 15 wt %, etc. All percent additions are by dry weight, unless otherwise indicated.

To further illustrate the present disclosure, an example is given herein. It is to be understood this example is provided for illustrative purposes and is not to be construed as limiting the scope of the present disclosure.

EXAMPLES

The raw materials and chemical components used in the illustrating samples are listed in Table 1.

TABLE 1

| Ingredients | Nature of the ingredients | Supplier |
|---|---|---|
| Disponil ®AFX 4030 | Surfactant - aqueous solution of a modified fatty alcohol polyglycol ether | BASF Co |
| Covercarb ® 85 | Particulate filler - ground calcium carbonate available | Omya Co |
| Hydragloss ® 90 | Particulate filler - kaolin clay | Kamin |
| Litex ® PX9740 | Polymeric binder - carboxylated styrene butadiene copolymer | Synthomer |
| Mowiol ® 13-88 | Polymeric binder - polyvinyl alcohol | Sigma-Aldrich |
| $CaCl_2$ | Colorant fixing agent | Aldrich |
| Sodium Hydroxide | pH control agent | Aldrich |
| Kamin ® 2000c | calcined kaolin clay | Performance Minerals |
| EC1722 | Calcium Stearate | American eChem |
| CD205 | Calcium Stearate | American eChem |
| CD220 | Calcium Stearate | American eChem |
| Calsan ® 55 | Calcium Stearate | BASF |

Example 1—Preparation of Printable Recording Media Samples

Different media were made using different coating compositions. Such compositions are prepared by mixing the ingredients, in water, as illustrated in Table 2. The coating composition chemicals are mixed together in a tank by using normal stirring equipment. Each coating layer compositions is applied on the on the image side of a raw base substrate (110) at a coat-weight of about 10 gram/square meter (gsm) using a Meyer rod in lab in view of obtaining the different media samples.

Coating composition A, B, C, and D are coated at a coat-weight of 10 gsm on a 45 #book paper base from Evergreen Packaging LLC® as a base supporting paper substrate in order to obtain the coated media Sample A, B, C and D. Coating composition $A_1$, $A_2$, $A_3$ and $A_4$ are coated at a coat-weight of 10 gsm on 75 #uncoated plain paper as a base supporting paper substrate in order to obtain the coated media Sample $A_1$, $A_2$, $A_3$ and $A_4$. The recording media are then calendered through a lab soft nip calendar machine (at 160° F./2000 psi at room temperature). Coating composition $A_1$, B and D are comparative coating compositions. Coated media $A_1$, B and D are comparative media samples.

The formulations of the coating composition are illustrated in the Table 2 below. Each number represent the dry weight percent (wt %) of each ingredient in the dry composition.

The particle sizes (PS) and particle size distribution (PSD) are measured using dynamic light scattering (DLS) on a Malvern Mastersizer.

TABLE 3

| Formula | Calcium Stearate Grade Sample Name | PS $D_{10}$ (μm) | $D_{50}$ (μm) | $D_{90}$ (μm) | PSD about 99.5% of the PDS is less than 80 μm |
|---|---|---|---|---|---|
| D | Average of 'Calsan ® 55 | 0.308 | 2.83 | 10.8 | no |
| B | Average of 'CD205' | 3.28 | 6.62 | 16.1 | no |
| C | Average of 'CD220' | 3.2 | 6.48 | 13.6 | yes |
| $A_{2-4}$ | Average of 'EC1722 | 5.09 | 10.9 | 24.5 | yes |

Example 2—Samples Performances

The same images are printed on the coated media samples $A_1$, $A_2$, $A_3$, $A_4$, A, B, C and D. The samples are printed using an HP CM8060 MFP printer with web press inkjet inks in the pens. The prints are made in 2 pass/6 dry spin mode. The resulting printed medias are evaluated for their gloss and durability performances.

The durability performances are measured with a Sutherland® Ink Rub tester. Sutherland dry rub test is designed to evaluate the scuffing or rubbing resistance of the printed or coated surface of paper, paperboard, film and other materials

TABLE 2

| Chemical Components | A1 (comp) | A2 | A3 | A4 | A | B (comp) | C | D (comp) |
|---|---|---|---|---|---|---|---|---|
| | Coating Compositions (in wt %) | | | | | | | |
| Covercarb ® 85 | 63.6 | 63.1 | 62.6 | 62.0 | 62.6 | 62.6 | 62.6 | 62.6 |
| Litex ® PX9740 | 10.2 | 10.1 | 10.0 | 9.9 | 10.0 | 10.0 | 10.0 | 10.0 |
| Disponil ® AFX 4030 | 0.3 | 0.3 | 0.3 | 0.2 | 0.3 | 0.3 | 0.3 | 0.3 |
| Kamin ® 2000c | 8.5 | 8.4 | 8.3 | 8.3 | 8.3 | 8.3 | 8.3 | 8.3 |
| Hydragloss ® 90 | 12.7 | 12.6 | 12.5 | 12.4 | 12.5 | 12.5 | 12.5 | 12.5 |
| Mowiol ® 13-88 | 1.7 | 1.7 | 1.7 | 1.7 | 1.7 | 1.7 | 1.7 | 1.7 |
| Calcium Chloride | 3.0 | 2.9 | 2.9 | 2.9 | 2.9 | 2.9 | 2.9 | 2.9 |
| Sodium Hydroxide | 0.1 | 0.1 | 0.1 | 0.1 | 0.1 | 0.1 | 0.1 | 0.1 |
| EC1722 | — | 0.8 | 1.7 | 2.5 | 1.7 | — | — | — |
| CD205 | — | — | — | — | — | 1.7 | — | — |
| CD220 | — | — | — | — | — | — | 1.7 | |
| Calsan ® 55 | — | — | — | — | — | — | — | 1.7 |
| Base Paper | 75# Uncoated Plain Paper | | | | Evergreen 45# Book Paper | | | |

Several dosage levels of calcium stearate are also tested in the coating formulations spanning from 0.8% by dry weight up to 2.5% by dry for coating composition formulation $A_2$, $A_3$ and $A_4$. The formula $A_1$ does not include any calcium stearate. Four different grades of calcium stearate are also tested with median particle diameters ($D_{50}$) ranging from about 2 μm to about 11 μm (Coating composition formulation A, B, C, and D). The particle sizes and particle size distribution of each grade are expressed in table 3.

FIG. 4 is a graph demonstrating the influence of the Malvern particle size (PS) of the different grades of calcium stearate tested (i.e. having about 99.5% of the particle size distribution which is less than 80 μm) that are present in Formula $A_{2-4}$, C and, D, on the Sutherland dry rub score. FIG. 5 illustrates the particle size distribution (PSD) of the different grades of calcium stearate tested that are present in Formula $A_2$, $A_3$, $A_4$, A, B, C and, D. In FIG. 5, all tested particles are calcium stearate and have similar $D_{50}$ but not the same particle size distribution.

and, specifically, to simulate paper-on-paper contact typical of many downstream manufacturing and distribution processes. Sutherland dry rub testing is completed 24 hours after printing, by rubbing an unprinted sheet against the printed sheet with 100 cycles under 4 lbs of force. The Sutherland® Ink Rub tester features a digital counter with a fiber optic sensor for accuracy and is compatible with the requirements of the ASTM D-5264 test method (on normal and heated condition). Durability test samples are ranked visually with a 1-5 score (Sutherland rub Score), where a score of 1 corresponds to severe ink scuffing/removal and a score of 5 corresponds to no ink scuffing/removal.

The surface gloss of each media sample is measured using a Micro Tri-Gloss Meter (available from BYK Gardner Inc) according to the standard procedures described in the instrument manual provided by the manufacturer. The Micro-Tri Gloss Meter is calibrated at seventy-five (75°) degrees using the standard supplied by the unit.

The mean particle sizes of each grade of calcium stearate dispersion, the gloss, and the associated durability test scores (Sutherland Dry Rub score) are listed below in Table 4 and Table 5. The results are different for the coated media samples $A_1$, $A_2$, $A_3$ and $A_4$ and for coated media samples B, C, D and E due to the different nature of the base substrate that has been used.

TABLE 4

| Formula | A | B (comparative) | C | D (comparative) |
|---|---|---|---|---|
| Sutherland Dry Rub score | 5 | 2 | 4 | 1 |
| Sheet Gloss (75°) | 71 | 70 | 68 | 72 |

TABLE 5

| Formula | A1 (comparative) | A2 | A3 | A4 |
|---|---|---|---|---|
| Sutherland Dry Rub score | 1 | 4 | 5 | 5 |
| Sheet Gloss (75°) | 83 | 82 | 80 | 81 |

FIG. 4, Table 4 and Table 5 demonstrate that the calcium stearate particle size has a strong impact on rub durability when incorporated into the media at 1.7 dry weight percent. The graph and tables show a trendline that has a strong correlation between larger particle sizes and normal distribution and strong Sutherland dry rub performance, when the particles have about 99.5% of the particle size distribution which is less than 80 μm. FIG. 5 demonstrates the influence of the particle size distribution on the durability: samples that do not have about 99.5% of the particle size distribution which is less than 80 μm show poor durability performance (i.e., Sample B)

The Sutherland rub results also show that when calcium stearate is omitted from the coating composition, rub durability performance is very poor. Adding in the particles, as defined in the present disclosure, boosts the rub durability performance to good and perfect performances (score of 4/5 and 5/5). The sheet gloss levels demonstrate that this mechanism of rub durability enhancement does not hurt the sheet gloss.

Therefore, it can be seen that the examples of recording media sample with the coating layer defined according to the present disclosure, have increased durability while not compromising gloss and image quality.

The invention claimed is:

1. A printable recording media comprising a base substrate with an image-side and a back-side and a coating composition, applied to the image-side of the base substrate, comprising, at least, i. particles of metallic salt of $C_8$-$C_{30}$ alkyl acid chain or alkyl ester chain, having a mean particle size ($D_{50}$) above 3 μm and having about 99.5% of the particle size distribution which is less than 80 μm;

ii. inorganic pigment particles and/or mixture inorganic particles;

iii. and polymeric binders and/or mixture of polymeric binders.

2. The printable recording media of claim 1 wherein the particles of metallic salt have a $C_{12}$-$C_{20}$ alkyl acid chain or alkyl ester chain.

3. The printable recording media of claim 1 wherein the particles of metallic salt have a $C_{17}$ alkyl acid chain or alkyl ester chain.

4. The printable recording media of claim 1 wherein the particles of metallic salt are present in an amount ranging from about 1 to about 10 wt % by total weight of the coating composition.

5. The printable recording media of claim 1 wherein the particles of metallic salt are present in an amount ranging from about 1.5 to about 5 wt % by total weight of the coating composition.

6. The printable recording media of claim 1 wherein particles of metallic salt have a mean particle size ($D_{50}$) that is ranging from about 5 μm to about 30 μm.

7. The printable recording media of claim 1 wherein the coating composition forms a layer with a coat-weigh ranging from about 0.5 gsm to about 40 gsm.

8. The printable recording media according to claim 1 wherein the coating composition is applied is applied to both opposing sides of the base substrate.

9. The printable recording media of claim 1 wherein the polymeric binder and/or mixture of polymeric binders are present in the coating composition, in an amount representing from about 1 wt % to about 18 wt % with respect to the inorganic particulate filler.

10. The printable recording media of claim 1 wherein the inorganic pigment particles and/or mixture inorganic particles are clay or calcium carbonate particles.

11. The printable recording media of claim 1 wherein the inorganic pigment particles and/or mixture inorganic particles are present in an amount representing from about 50 wt % to about 92 wt % by total weight of the coating composition.

12. The printable recording media of claim 1 wherein the coating composition further includes fixative agents.

13. The printable recording media of claim 12 wherein the fixative agent is a metallic salt, a cationic amine polymer, a quaternary ammonium salt, or a quaternary phosphonium salt.

14. A method for forming a printable recording media comprising:

a. providing a base substrate, with an image-side and a back-side;

b. applying a coating composition comprising particles of metallic salt of $C_8$-$C_{30}$ alkyl acid chain or alkyl ester chain, having a mean particle size ($D_{50}$) above 3 μm and having about 99.5% of the particle size distribution which is less than 80 μm; inorganic pigment particles and/or mixture inorganic particles, and polymeric binders and/or mixture of polymeric binders, to the image-side of the base substrate;

c. and drying the coating composition to remove water from the media substrate to leave an ink-receiving layer thereon.

15. A printing method comprising:

a. obtaining a printable recording media comprising a base substrate with an image-side and a back-side, and a coating composition, applied to the image-side of the base substrate, comprising particles of metallic salt of $C_8$-$C_{30}$ alkyl acid chain or alkyl ester chain, having a mean particle size (D50) above 3 μm and having about 99.5% of the particle size distribution which is less than 80 μm; inorganic pigment particles and/or mixture inorganic particles, and polymeric binders and/or mixture of polymeric binders;

b. and applying an ink composition onto said printable recording media to form a printed image.

* * * * *